Aug. 6, 1957 F. W. GUIBERT 2,801,547
ADJUSTABLE TRANSMISSION MECHANISM UTILIZING A FLEXIBLE BELT PROVIDED WITH PROJECTIONS
Filed Nov. 15, 1954 2 Sheets-Sheet 1
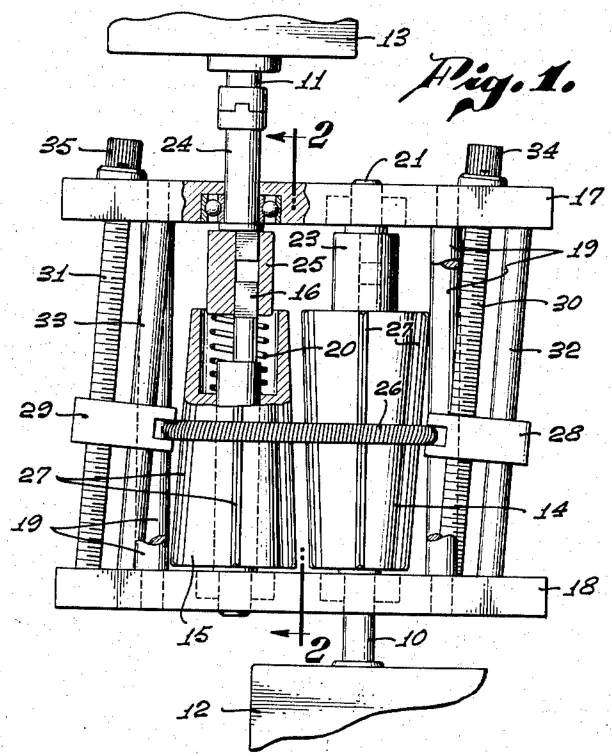
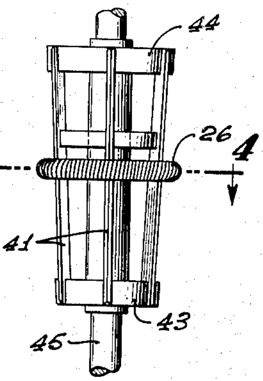
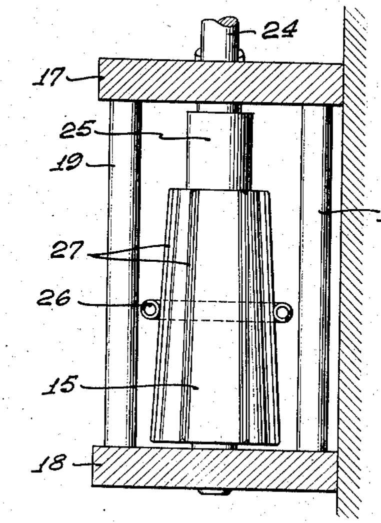
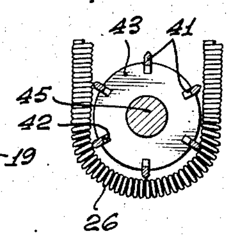
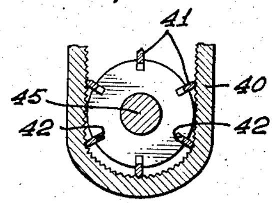
FRANCIS WALTER GUIBERT,
INVENTOR.
BY Flam and Flam
ATTORNEYS.

Aug. 6, 1957 F. W. GUIBERT 2,801,547

ADJUSTABLE TRANSMISSION MECHANISM UTILIZING A FLEXIBLE BELT PROVIDED WITH PROJECTIONS

Filed Nov. 15, 1954 2 Sheets-Sheet 2

FRANCIS WALTER GUIBERT,
INVENTOR.

BY Flam and Flam

ATTORNEYS.

2,801,547
Patented Aug. 6, 1957

2,801,547

ADJUSTABLE TRANSMISSION MECHANISM UTILIZING A FLEXIBLE BELT PROVIDED WITH PROJECTIONS

Francis Walter Guibert, Los Angeles, Calif.

Application November 15, 1954, Serial No. 468,761

11 Claims. (Cl. 74—217)

This application relates to improvements in adjustable compensators for meters or the like of a type similar to those shown in my United States Letters Patent No. 2,638,008, issued May 12, 1953, and entitled Adjustable Compensator for Registering Meters, and in my application Serial No. 297,231, now Patent No. 2,712,759, issued July 12, 1955, and entitled Adjustable Ratio Belt Drive.

In that patent and in said application there is shown a compensator utilizing as driving and driven elements a pair of cone pulleys and a flexible belt movable longitudinally thereof. Adjustment of the position of the belt varies the ratio of transmission throughout a continuous range in a well-known manner.

A compensator of this character can be adjusted to determine quite accurately a desired ratio of transmission. However, unless the belt is prevented from slipping, the full capability of the compensator so far as accuracy is concerned is not achieved.

In prior devices, slippage could be induced by lubricant. Also in such devices slippage resulted since the opposite edges of the belt engaged different portions of the cones. This tended to cause one edge of the belt to move at a different linear speed than the other. Slippage, which is more or less depending upon the relative friction at opposite edges, counterbalanced the tendency. Such slippage was incapable of accurate anticipation, since it depends on the vagaries of friction. Accordingly, the accuracy of such prior devices was poor. It is an object of this invention to provide a simple arrangement for overcoming these disadvantages and ensuring against belt slippage, particularly by ensuring a point contact between the belt and the cones.

In another embodiment of the invention, the driving and driven members each comprise a series of spaced ribs arranged as elements of a conical surface. For transmitting motion between the two members, use is made of a belt member, formed of an endless coiled wire, strung beads, or washers, or the like, or other elements providing projections interengageable by the relatively sharp edges of the ribs.

Substantially a point contact between the belt member and the ribs is provided, permitting accurate adjustment of the compensator and preventing slippage.

It is another object of this invention to make it possible to use a lubricant or protective liquids on a compensator of this character without inducing slippage of the belt.

This invention possesses many other advantages, and has other objects which may be made more clearly apparent from a consideration of several embodiments of the invention. For this purpose, there are shown a few forms in the drawing accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is an elevation of an apparatus incorporating the present invention;

Fig. 2 is a sectional view, taken along the plane indicated by line 2—2 of Fig. 1;

Fig. 3 is a plan view of a modified form of the present invention;

Fig. 4 is a sectional view, taken along the plane indicated by line 4—4 of Fig. 3;

Fig. 5 is a sectional view, similar to Fig. 4, showing another modified form of the present invention;

Figure 6:
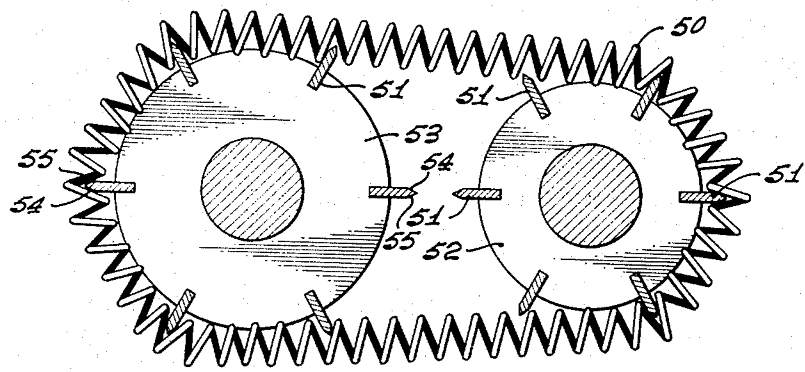
Fig. 6 is an enlarged sectional view, taken along a plane extending transversely of a pair of cone pulleys, and showing still another modified form of the present invention.

The compensator shown in Figs. 1 and 2 couples shafts 10 and 11 of a meter 12 or other power source and register 13, or other device. The compensator is adjustable to vary the ratio of transmission between the shafts for accurate registry of the quantity metered.

The compensator includes a pair of oppositely diverging cone pulleys 14 and 15 connected respectively to the shafts 10 and 11. One of the pulleys 14, mounted upon the meter or input shaft 10, serves as a driving pulley; and the other pulley 15, mounted upon a shaft 16 connected to the register or output shaft 11, serves as a driven pulley.

A support, including a pair of spaced parallel plates 17 and 18, is provided. Four rectangularly oriented posts 19 rigidly interconnect the plates 17 and 18. The pulleys 14 and 15 are disposed between the plates 17 and 18 with their axes parallel to each other and normal to the plates.

The meter shaft 10, upon which the driving pulley 14 is mounted, projects upwardly through the base 18. A stub shaft 21 projecting inwardly from the upper plate 17 is aligned with an separatably coupled to the meter shaft 10 by a sleeve 23. This coupling can be effected in the same manner as shown in said copending application.

The outer end of a connecting shaft 24 which projects through the upper plate 17 is in driving engagement with the register shaft 11. Its inner end is aligned with and separably coupled to the driven cone pulley shaft by a sleeve 25.

The sleeves 23 and 25 have non-circular apertures which receive corresponding non-circular ends of the shafts which are to be coupled. Compression springs 20, accommodated in recesses at the ends of the cones, urge the sleeves upwardly into operative coupling position. The sleeves 23 and 25 when moved downwardly clear the end of one of the shaft parts.

The basic mode of operation of the cone pulleys is conventional, an endless flexible belt 26 selectively positionable axially of the cone pulleys 14 and 15 encircling both cone pulleys 14 and 15 to effect a variable ratio transmission.

In the present instance, the operative portions of the cones are formed by integral ribs 27 extending longitudinally along and projecting radially beyond the outer surfaces of the cone pulleys. The ribs 27 are equiangularly arranged, and their outer edges form separated elements of a cone. The ribs 27 provide knife edges facing radially outwardly of the pulleys. The flexible belt 26 is engaged by the edges of the ribs 27 only at intervals along its length.

The flexible belt 26 is formed in such manner as to provide a continuous series of projections that are interengaged by the edges of the ribs 27. This interengagement between the belt and the pulley structures prevents slippage of the belt with respect to the pulleys, thereby ensuring one hundred per cent registry of the quantity metered.

In the present instance, the flexible belt 26 comprises closely convoluted wire or a tightly wound endless spring. The turns of the wire or spring may normally engage each other, in which event the curved cross section of the wire provides the desired projections. Optionally the turns of the wire or spring may normally be slightly separated, in which event the actual turns provide the desired projections.

In order to adjust the ratio of transmission of the compensator, the belt 26 is moved axially of the cone pulleys 14 and 15. To accomplish this purpose, a pair of guides or shifters 28 and 29 are provided. The guide 28 is movable along and parallel to the outer element of the cone described by the ribs 27 of the driving cone pulley 14. The guide 28 has an operative bifurcated end guidingly receiving the belt 26 and determining its position axially of the driving cone pulley 14.

The guide 29 similarly is movable parallel to and along the outer element of the cone described by the ribs 27 of the driven pulley 15. The operative end of the guide 29 has bifurcations guidingly receiving the belt 26 at a place opposite the other guide 28. The guides 28 and 29 engage diametrically opposite portions of the belt, providing appropriate support.

Inclined lead screws 30 and 31, carried by the plates 17 and 18, cooperate with the guides 28 and 29 to determine their positions along the cone pulleys 14 and 15. The guides 28 and 29 are prevented from moving angularly with the lead screws 30 and 31 by bars 32 and 33 which pass through apertures in the guides 28 and 29.

In the present instance, separate knobs 34 and 35 are provided at the upper ends of the lead screws for turning them. These knobs 34 and 35 may cooperate with dials indicating the setting of the guides. The guides 28 and 29 are independently adjustable in order to increase the accuracy of the adjustment.

The belt 26 can conveniently be operatively positioned or removed by first moving the guides 28 and 29 upwardly until they clear the ends of the cone pulleys. The belt can be passed between the shafts mounting the pulleys by moving the sleeves 23 and 25 downwardly to provide the required separation.

When the flexible belt 26 is moved upwardly of the cone pulley structures 14 and 15, the ratio of transmission between the meter and register shafts 10 and 11 is increased, the effective diameter of the driving pulley increasing and the effective diameter of the driven pulley decreasing. Similarly, upon downward movement of the flexible belt 26, the ratio of transmission between the meter and register shafts 10 and 11 is reduced. A central position of the flexible belt 26 corresponds to a one-to-one ratio of transmission.

Although the ribs 27 are out of alignment with the pitch of the convolutions of the flexible belt 26, the ribs may enter slightly between the turns especially if the turns are normally slightly separated from each other. Substantially a point contact between the ribs 27 and the flexible belt 26 is ensured in either case, as shown in Fig. 2, by virtue of the circular configuration of the belt, ensuring a definite ratio of transmission for a given position of the belt.

In the event that the register resists movement, the resilience of the belt 26 permits the driving pulley to continue rotating, ensuring against the imposition of undue sudden forces on the meter.

In the form shown in Figs. 3 and 4, there is a cone pulley member of different form cooperable with the spring or helically wound belt 26.

In the present instance, the cone pulley is a skeletonized structure. Ribs 41, instead of being integrally formed on a solid cone, are separate elements supported in radial slots 42 in otherwise annular end supporting members 43 and 44. A shaft 45 mounting the cone pulley structure passes through both supporting members 43 and 44 and is suitably rotatably coupled to the supporting members.

In the form shown in Fig. 5, the cone pulley structure is the same as that of the form shown in Figs. 3 and 4. The belt 40 in this instance is made of leather, or other flexible material, having a series of serrations transverse to the belt. The serrations are interengaged by the ribs 41 and ensure against slippage.

In Fig. 6 an endless coil spring belt 50 is shown cooperating with ribs 51 of driving and driven pulleys 52 and 53. In the present instance the adjacent turns of the belt 50 are substantially separated, the distance between adjacent turns being greater than the width of the ribs. Accordingly, the ribs 51 easily enter between the turns.

Inward movement of the ribs 51 is arrested by engagement of the complementary half turns with opposite sides of the ribs.

The distinct pitch of the turns ensures only point contacts on opopsite sides of the ribs, as, for instance, at 54 and 55. While the points 54 and 55 are slightly separated longitudinally along the rib, their respective distances from the axis of movement of the pulley 53 are for all purposes equal, due to the symmetry of the turns in a plane extending longitudinally of the belt.

The operation of the form shown in Fig. 6 is otherwise similar to that of the forms in Figs. 1 to 4.

Figure 7:
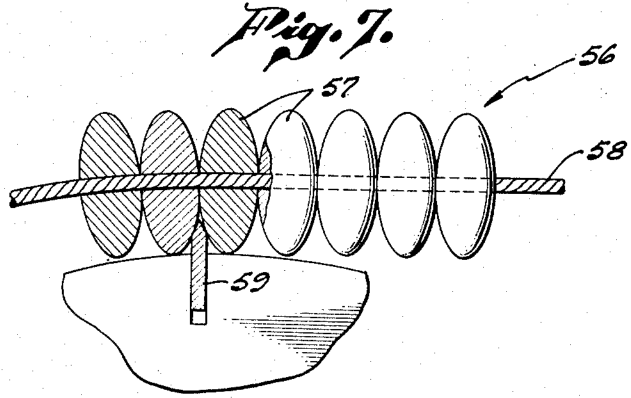
Figs. 7 and 8 are enlarged views of fragmentary portions of modified forms of the belt for use in the invention.
Figure 8:
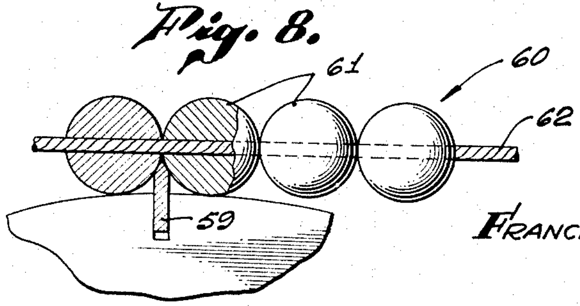

Other types of belts useful in the compensator are shown in Figs 7 and 8. The belt 56, shown in Fig. 7, comprises a series of biconvex elements 57 strung closely upon an endless flexible and/or resilient cord 58 or the like. In Fig. 8, the belt 60 comprises a series of spherical elements 61 similarly strung upon a flexible element 62. In both cases the convex surfaces of the elements 57 or 61 ensure a point contact with the ribs 59 entering between the elements substantially in the same manner as in connection with the helical belt 50 of the form shown in Fig. 6.

In all forms, the arrangements not only ensures against the belt slipping and twisting, but makes it possible for lubricant or a protective liquid to be freely used on the compensator. Fluids on the belt will not induce slippage of the belt, since a positive coupling exists between it and the ribs.

The inventor claims:

1. In a device of the character described: a rotary driving element; a rotary driven element; said elements having parallel spaced axes; each of said elements having a series of angularly spaced ribs corresponding to elements of a conical surface; the ribs of the elements diverging in opposite directions; and a coiled wire belt engaging the ribs.

2. In a cone pulley structure: a cone pulley element having a series of ribs angularly spaced about an axis and converging in one axial direction; and a longitudinally expansible belt having a series of projections interengaged by the ribs.

3. In a cone pulley structure: a cone pulley element having a series of ribs angularly spaced about an axis and converging in one axial direction; and an endless longitudinally expansible belt comprising interconnected turns of wire.

4. In a cone pulley structure: a cone pulley element having a series of ribs angularly spaced about an axis and converging in one axial direction; and an endless helically wound spring the turns of which form projections interengaged by said ribs.

5. In a cone pulley structure: a cone pulley element having a series of ribs angularly spaced about an axis and converging in one axial direction; and an endless belt made of flexible material having serrations extending transverse to the belt to form projections interengaged by said ribs.

6. In a device of the character described: a rotary driving member; a rotary driven member; each of said members comprising a pair of spaced supporting elements, and a plurality of elongate ribs having ends respectively attached to the respective supporting elements, the ribs being angularly spaced about an axis extending between the supporting elements and converging in an axial direction; means mounting the members for rotation on parallel axes corresponding respectively to the axes about which said ribs are spaced, said mounting means oppositely oriently the members; and an endless helically wound spring belt encircling both members, the turns of the spring belt forming projections interengaged by said ribs.

7. In a cone pulley structure: a cone pulley element having a series of ribs spaced about an axis and converging in one axial direction; and an endless helically wound spring forming a belt for the pulley, the turns of which are separated for entry of the ribs between the turns, the separation between the turns being sufficient to provide engagement of the ribs with only one of two adjacent turns, the substantial pitch of the turns ensuring a point contact only with the ribs.

8. In a device of the character described: a rotary driving element; a rotary driven element; said elements having parallel spaced axes; each of said elements having a series of angularly spaced ribs corresponding to elements of a conical surface; the ribs of the elements diverging in opposite directions; and a coiled wire belt engaging the ribs, the inclination of the turns of the wire belt providing a point contact with the ribs.

9. In a device of the character described: a rotary driving element; a rotary driven element; said elements having parallel spaced axes; each of said elements having a series of angularly spaced ribs corresponding to elements of a conical surface; the ribs of the elements diverging in opposite directions; and a coiled wire belt engaging the ribs, the wire forming the belt having a circular cross-section, and the turns of the belt being closely spaced, the circular cross-section of the belt and the inclination of the turns of the belt providing a point contact with the ribs.

10. In a cone pulley structure: a cone pulley element having a series of ribs spaced about an axis and all converging toward each other in one axial direction, said ribs having elongate knife edges facing radially outwardly of the cone pulley element; a series of biconvex elements; flexible means endlessly and substantially contiguously connecting the biconvex elements together to form a belt for the pulley, the edges penetrating between adjacent biconvex elements, the thickness of the biconvex elements being substantially less than the spacing between adjacent ribs for causing only one side of the elements to be engaged by the ribs, and whereby a plurality of elements extend between adjacent ribs.

11. In a cone pulley structure: a cone pulley element having a series of ribs spaced about an axis and all converging toward each other in one axial direction, said ribs having elongate knife edges facing radially outwardly of the cone pulley element; a series of spherical elements; flexible means endlessly and substantially contiguously connecting the spherical elements together to form a belt for the pulley, the knife edges penetrating between adjacent spherical elements, the thickness of the spherical elements being substantially less than the spacing between adjacent ribs for causing only one side of the elements to be engaged by the ribs, and whereby a plurality of elements extend between adjacent ribs.

References Cited in the file of this patent

UNITED STATES PATENTS

| | | |
|---|---|---|
| 944,585 | Watson | Dec. 28, 1909 |
| 2,026,928 | Back | Jan. 7, 1936 |

FOREIGN PATENTS

| | | |
|---|---|---|
| 493,023 | France | Apr. 14, 1919 |
| 298,668 | Italy | July 12, 1932 |